United States Patent [19]

Scheffel

[11] 4,050,554
[45] Sept. 27, 1977

[54] AUTOMATIC BRAKE RESETTING DEVICE
[75] Inventor: Bernd Scheffel, Munich, Germany
[73] Assignee: Knorr-Bremse GmbH, Munich, Germany
[21] Appl. No.: 708,047
[22] Filed: July 23, 1976
[30] Foreign Application Priority Data
  Dec. 5, 1975 Germany .............................. 2554816
[51] Int. Cl.² ............................................ F16D 65/66
[52] U.S. Cl. ................................ 188/203; 188/196 D; 192/111 A
[58] Field of Search ................... 188/196 D, 202, 203, 188/71.9; 192/111 A

[56] References Cited
U.S. PATENT DOCUMENTS

| | | | |
|---|---|---|---|
| 3,727,732 | 4/1973 | Barr | 188/77 W X |
| 3,874,480 | 4/1975 | Porter et al. | 188/77 W X |
| 3,878,924 | 4/1975 | Nadas | 188/196 D X |
| 3,899,053 | 8/1975 | Nadas | 188/196 D X |

Primary Examiner—George E. A. Halvosa
Attorney, Agent, or Firm—Edmund M. Jaskiewicz

[57] ABSTRACT

In a brake cylinder there is a reciprocating piston from which extends a non-rotatable sleeve surrounding a co-axial non-rotatable axially displaceable threaded shaft upon which is threaded a coupling nut. A pair of rotary couplings are provided on opposed sides of the coupling nut with the sleeve and the rotary couplings are actuable by axial displacement of the coupling nut. A stop ring is axially displaceable on the coupling nut and is supported opposite to the braking direction by a fixed stop. A second stop on the coupling nut is spaced rearwardly of the first stop a distance approximately equal to the contact stroke of the vehicle brake when the resetting device is in the inoperative position. To provide for single acting operation, the resetting device is provided with a spring which has one end acting against the stop ring and the other end acting against an abutment on the sleeve. To provide for double acting operation a compression spring is inserted between the stop ring and the coupling nut to load the coupling nut in the braking direction. This additional compression spring is mounted for rotation in at least one direction.

5 Claims, 3 Drawing Figures

AUTOMATIC BRAKE RESETTING DEVICE

The present invention relates to an automatic brake resetting device, more particularly, to a device which can be either single acting or double acting for adjustment of the contact stroke of the brake on railway vehicles.

It is known to provide the brakes on railway vehicles with automatic brake linkage adjusting devices. One such device comprised an adjustable, axially displaceable non-rotatable shaft having reversible threads thereon. The shaft transmits braking force and is disposed co-axially within a non-rotatable sleeve connected to a source of braking force. A coupling nut is threaded on the shaft and two rotary clutches positioned on opposite sides of the coupling nut are actuated by axial displacement of the coupling nut with respect to the shaft. An axially displaceable stop ring is mounted upon the coupling nut and the stop ring is loaded by a spring acting contra the direction of the braking force. The stop ring abuts against a fixed stop which holds the stop ring from movement opposite to the braking direction. A flange on the coupling nut is spaced rearwardly of the fixed stop a distance approximately equal to the contact stroke of the vehicle brake. With the brakes of railway vehicles, it has been desirable to provide either a single-acting or a double-acting automatic brake resetting device depending upon the type of brakes installed upon the vehicle. It is advantageous to employ a single acting brake resetting device for the operation of disc brakes while a double acting adjusting device is preferable for the operation of the conventional brakes utilizing a brake shoe acting upon a wheel. An automatic brake adjusting device has been proposed constructed essentially on the principle as described above which device is both single acting and double acting. Not only was this device relatively simple to manufacture but also had a simple structure requiring only a few components and occupied a relatively small space. In addition, during the braking operation the force of the brake motor acted only against a relatively weak spring so as to effect high brake application forces. However, this brake linkage adjusting device as known in the prior art had the disadvantage of employing a control sleeve which had a limited range of displacement by the brake contact stroke between two fixed stops, and also, the distance between the stop ring and the coupling nut flange should correspond to the same contact stroke. Difficulties have been encountered in adjusting these two dimensional relationships to each other. In addition, the spring which loads the stop ring must absorb resiliently the entire brake stroke and, as a result, the brake stroke is limited by the spring. Since the spring acts upon the control sleeve and at the completion of the brake stroke acts upon one of the fixed stops, the adjusting of the position of the fixed stop in order to vary the magnitude of the brake contact stroke will produce a change which interferes with the maximum value of the brake stroke.

In another form of the brake linkage adjusting device as generally described above, the brake stroke can be absorbed by a second spring and can thus be increased. However, this use of a second spring is generally limited to this particular construction of the adjusting device and the inclusion of the second spring may give rise to significant structural difficulties.

It is therefore the principal object of the present invention to provide a novel and improved automatic resetting device which may be constructed to be single-acting or double-acting.

It is another object of the present invention to provide an automatic brake resetting device as described herein which is simple in construction, requires a minimum of components, occupies a relatively small volume when assembled on a vehicle, and whose total length is maintained at a minimum.

It is a further object of the present invention to provide such an automatic brake resetting device which transmits the entire force exerted by the brake motor.

It is an additional object of the present invention to provide such an automatic brake resetting device wherein the brake contact stroke can be established through a single dimension in an adjustment mechanism and the spring does not limit the distance of the brake stroke which may be of a relatively large magnitude.

According to one aspect of the present invention a brake resetting device may comprise a non-rotatable sleeve which is axially displaceable in the braking direction in response to a braking force and an axially displaceable non-rotatable threaded shaft is co-axially disposed within the sleeve. A coupling nut is threaded upon the shaft so as to be capable of rotary and axial movement thereon. The sleeve is provided with means disposed on both sides of the coupling nut to define a first rotary coupling with one side of the coupling nut and a second rotary coupling with the other side of the coupling nut. The rotary couplings are actuable by axial displacement of the coupling nut. A stop ring traverses the coupling nut so as to be axially displaceable thereon and a fixed stop supports the stop ring contra the braking direction. On the coupling nut there is a second stop spaced rearwardly of the first stop a distance which is approximately equal to the brake stroke when the brake resetting device is in the inoperative position. For a single-acting operation, a spring acts upon the stop ring opposite to the braking direction of the sleeve and acts upon the abutment means on the sleeve in the braking direction. For double-acting operation, a second compression spring is positioned between the stop ring and the coupling nut for rotation in at least one direction and acts upon the coupling nut in the braking direction.

As a result of this construction, the maximum compression of the spring will consist of the brake contact stroke increased by the coupling distance of the rotary couplings. Thus, the spring can be made relatively short in length together with the adjusting device and the spring will not limit the length of the braking stroke. In addition, the length of the contact stroke is determined only by the position of a single stop. Since only a single dimension or parameter is thus involved in adjusting the contact stroke manufacturing tolerances are not critically important if the stop is adjustably positionable and the adjusting device is constructed with a relatively short stroke distance. Merely by the simple insertion of an additional compression spring can the single-acting embodiment of the adjusting device of the present invention be readily transformed into a double-acting embodiment without any further structural changes.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
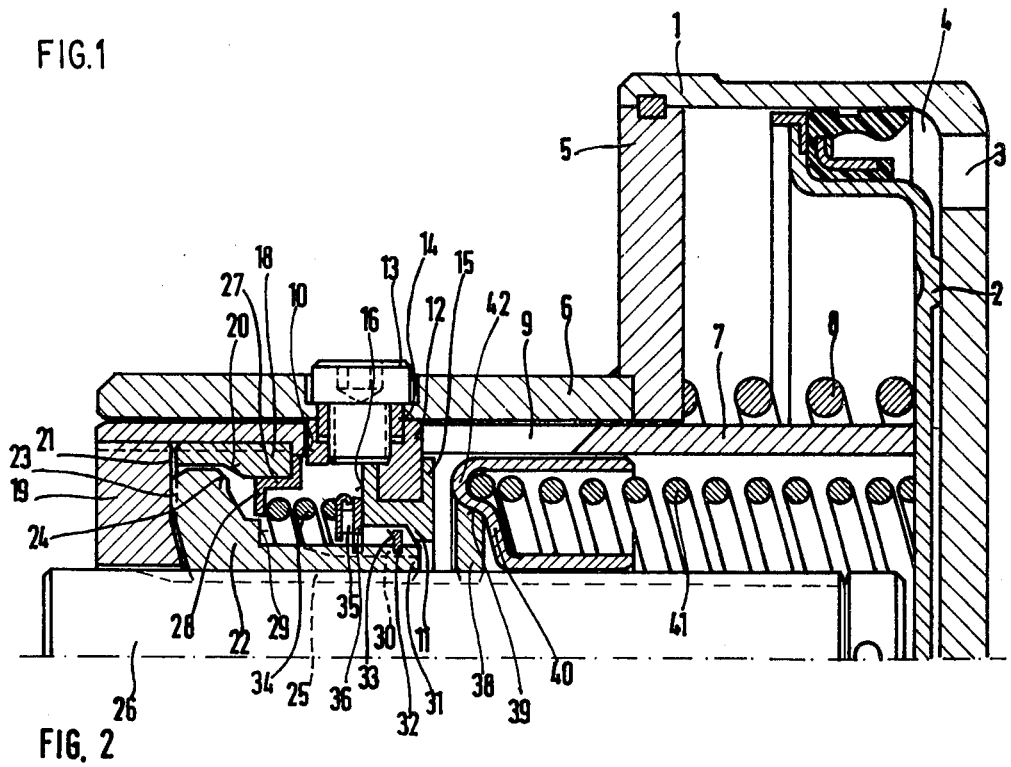
FIG. 1 is a longitudinal sectional view of a single-acting embodiment of a brake resetting device according to the present invention combined with a brake cylinder.

The single-acting embodiment of FIG. 1 comprises a brake cylinder housing 1 having a brake piston 2 sealed therein for axial displacement. A line connection 3 in the cylinder housing 1 permits the introduction of a pressure medium into a cylinder chamber 4 which is located between the bottom of the cylinder housing 1 and the piston 2.

The front side of the brake cylinder housing 1 is closed off and sealed by a cover plate 5 from which extends a tubular projection 6 within which is displaceably positioned a sleeve 7 one end of which is attached to the piston 2. A linkage return spring 8 is positioned between the cover plate 5 and the piston 2.

In the portion of the sleeve 7 which is axially displaceable within the tubular projection 6 there is formed a slot 9 at one end of which is a forward stop 10. Within the sleeve 7 there is an annular stop ring 11 mounted on an intermediate member 12 which extends into the slot 9. The stop ring 11 is mounted so as to be non-rotatable and non-displaceable within the tubular portion 6. Screws 13 secure the intermediate member 12 to the tubular portion 6 and in order to relieve the threads of the screws 13 of at least a portion of the load, sleeves 14 are positioned around each screw 13 over at least a portion of its length.

The radial face of the stop ring 11 facing toward the piston 2 forms a stop 15 and the radial face on the other side of the stop ring 11 forms in its radially forward portion a stop 16. Securely threaded into the forward end of the sleeve 7 are two coupling rings 18 and 19 which have coupling faces 20 and 21 respectively facing toward each other.

Positioned between the coupling rings 18 and 19 is a coupling nut 22 having a coupling surface 24 facing toward the coupling surface 20 of coupling ring 18 and a coupling surface 23 facing toward the coupling surface 21 of the coupling ring 19. The coupling surfaces 20 and 24 thus define a rotary clutch or coupling 20, 24 in the form of a cone friction clutch and the coupling surfaces 21 and 23 which extend radially are provided with axially extending teeth to form a rotary clutch 21, 23 between the coupling nut 22 and the sleeve 7.

The coupling nut 22 is threaded upon a reversible or nonself-locking thread 25 upon an adjusting spindle or shaft 26 whose end directed away from the brake piston 2 is pivotally connected in a known manner to a brake linkage which is not shown in the drawing. When the coupling nut 22 is rotated on the threaded shaft 26 so as to move to the right as viewed in the drawing which direction is opposite to the direction of the brake force, the brake linkage is extended which decreases the contact stroke when the vehicle brake is operated. The contact stroke is the distance through which the shaft 26 moves from its initial inoperative position to the position where contact is made between the braking surfaces.

Turning of the coupling nut 22 in the opposite direction so that the nut is displaced toward the right as viewed in the drawing increases the length of the contact stroke.

The end of coupling ring 18 facing toward the brake cylinder piston 2 is provided with a radial stop surface which is contacted by an annular shoulder portion of an abutment ring 27 having a stepped cross-section as may be seen in the drawing. The abutment ring 27 is provided with a radially inwardly extending flange portion 28. Thus, when the ring 27 is acted upon by a spring, as will be later described, in the braking direction the abutment ring will be supported against the sleeve 7 by the interaction of the shoulder on the ring 27 against the radial stop surface of the coupling ring 18.

The coupling nut 22 has an annular shoulder 29 and a tubular extension 31 extending in the direction toward the brake piston 2. The outer surface of the extension 31 is provided with axially extending flat portions 30. The extension 31 projects into the zone of the stop ring 11. A flange ring 32 is fixed on the outer surface of the tubular extension 31 in the vicinity of the stop ring 11 to provide a second stop 33.

A spring 34 surrounds the extension 31 with a substantial clearance and one end of the spring 34 engages the annular portion 28 of abutment ring 27 and the other spring end connects through a thrust bearing 35 a stop ring 36 which is positioned against the stop 16 and is mounted on the extension 31 so as to be axially displaceable thereon. The central opening of the stop ring 36 is shaped to conform closely with the flat portion 30 on the extension 31 so that the ring 36 is capable of being displaced longitudinally but is non-rotatable with respect to coupling nut 22. The inner peripheral portion of the stop ring 36 extends radially inwardly of the ring 11 so as to contact the stop 33 on the flange 32. The distance between the stop ring 36 and flange 32 when the brake resetting device is in its inoperative or release position is approximately equal to the contact stroke of the friction brake. The stop ring 36 is non-rotatable at least in the direction of rotation of the coupling nut 22 which shortens the contact stroke. As a result, shocks and impacts upon the brake linkage will not cause accidental displacement of the adjusting device even when the brake is in the released position.

An adjusting nut 38 is threaded on the shaft 26 in the area between the stop ring 11 and the piston 2 so as to engage at 39 against a guide ring 40 which is mounted for axial displacement around the shaft 26 and within the sleeve 7. The stop 39 prevents rotation of the guide ring 40. A compression spring 41 is inserted between the piston 2 and the guide ring 40 to load the ring 40 in the braking direction against the adjusting nut 38. The guide ring 40 is maintained in a non-rotatable relationship with respect to the brake cylinder piston 2 by known structure which is not shown in the drawings, but which may comprise radially projecting bosses extending into a longitudinal groove formed in the sleeve 7 or solely by means of friction forces exerted by the compression spring 41. The guide ring 40 is provided with a bulging or projecting portion 42 positioned radially outwardly of the adjusting nut 38 so that the bulge extends axially slightly beyond the adjusting nut 38 and thus engages the stop 15 while permitting a small axial clearance between the adjusting nut 38 and the stop 15. This axial clearance assures that during the release operation of the brake, the brake linkage actuated by the adjusting device will remain in the brake contact position, but without any force, after the brake application force is reduced. The brake linkage is moved into the full release position only by applying force to the adjusting device. While this function will generally occur by itself in the brake linkage because of frictional forces therein the present invention provides a simple but effective structure which requires only a very short axial distance and virtually adds nothing to the overall length of the adjusting device.

In operation, the single-acting adjusting device as described above functions in the following manner:

In the inoperative condition when the brakes are released, there is no pressure in the chamber 4 and the return spring 8 presses the piston 2 into its end position in a direction away from the cover plate 5. This end position may occur when the piston 2 engages the bottom of the cylinder as shown in the drawing or as determined by the contact of the end 10 of the slot 9 with the forward portion of the intermediate member 12. The piston 2 would then be positioned a short distance spaced from the bottom of the cylinder. The spring 34 exerts a force in one direction through the thrust bearing 35 and the annular element 36 against stop 16 on the fixed stop ring 11 and exerts a force in the other direction to urge the abutment ring 27 against the coupling ring 18 and, accordingly, against the sleeve 7. Since the return spring 8 is considerably stronger than the spring 34, the force exerted by the spring 34 is merely expended to the stop ring 11 and to the tubular portion 6. The rotary clutch 21, 23 is closed and the rotary clutch 20, 24 is open or disengaged. The stop 33 is positioned behind the stop ring 36 at a distance which corresponds to the contact stroke of the vehicle brake. The bulge 42 on the guide ring 40 is spaced from the stop 15 on stop ring 11 a distance corresponding to the stroke increased by a travel distance corresponding to the resilient brake linkage deformation or taking up of slack under maximum brake actuation conditions. The compression spring 41 exerts sufficient force against guide ring 40 through stop 39 against the adjusting nut 39 to prevent rotation of this adjusting nut. The coupling nut 22 which is secured against rotation has a force exerted thereon by the compression spring 41 through the adjusting nut 38 and the shaft 26 to increase the closing force of the rotary clutch 21, 23 on the front face of the coupling nut 22. The force exerted by the compression spring 41 is thus expended through coupling ring 19 and the sleeve 7.

As may be seen in FIG. 1, the adjusting spindle or shaft 26 is threaded to its maximum extent in the direction toward the brake cylinder housing 1. In practical operation, the shaft 26 will generally be in a position where it is threaded a short distance in the opposite direction. The brake linkage, which is not shown in the drawing, retains the shaft 26 so as to be non-rotatable about its longitudinal axis.

Unintentional rotation of the coupling nut 22 and consequently unintentional displacement of the coupling nut cannot occur should the shaft 26 be subjected to longitudinal forces from the brake linkage such as might be produced by shocks and impacts acting on the vehicle and because of the inertia of the linkage. Such forces which are directed toward the left as viewed in the drawing are transmitted to the sleeve 7 while increasing the coupling forces of the coupling 21, 23 and the coupling nut 22 will thus be held securely against rotation. Should such forces occur directed toward the right as viewed in the drawing, the coupling nut 22 may become separated from coupling ring 19 against the force of the spring 41 but will be maintained against rotation by the interaction of the flat portions 30 and the stop ring 36 which will be pressed by the spring 34 against fixed stop 16 and thus cannot turn because of a frictional coupling. Accordingly, the coupling nut 22 cannot be rotated on the shaft 26. After this force diminishes, the spring 41 will again press the coupling nut 22 against coupling ring 19.

In order to actuate the brake, a pressure medium as known in the art is introduced into the cylinder chamber 4 and the brake piston 2 is correspondingly displaced against the force of return spring 8 in the braking direction toward the cover plate 5. The sleeve 7 with its coupling rings 18 and 19 is also displaced in the braking direction together with the coupling nut 22 and shaft 26 under the force exerted by spring 41. The spring 41 acts on the shaft 26 through guide ring 40, stop 39, and adjustment nut 38 which will be retained against rotation. The rotary coupling 21, 23 will remain engaged. The tension of spring 34 will be somewhat decreased during this operation but the spring 34 will still maintain the stop ring 36 in contact with stop 16.

If the brake application stroke has been properly set, the brake will become engaged just when the shaft 26 has advanced to such an extent that stop 33 of the flange ring 32 just engages the stop ring 36. During further application of the braking stroke, the brake cylinder piston 2 together with sleeve 7 will be displaced further in the braking direction but the coupling nut 22 will not be able to accompany this displacement because of the contact between flange 32 and the stop ring 36. As a result, the rotary coupling 21, 23 will become disengaged and the rotary coupling 20, 24 will be immediately engaged. During this change of states of the couplings the coupling nut 22 will be secured against rotation by the stop ring 36.

Should the application stroke of the brake linkage be too short such as might occur when the brake lining has just been replaced, the brake will become engaged when there is still a predetermined distance existing between the stop 33 and the stop ring 36. Upon further advance of the brake cylinder piston 2 in the braking direction together with the sleeve 7 and the coupling rings 18 and 19, the spring 41 will no longer be able to carry along the shaft 26. The shaft 26 will now remain stationary because of the force acting in the opposite direction and exerted by the applied brake through the brake linkage. The coupling ring 19 is thus separated somewhat from the coupling nut 22 so that the rotary coupling 21, 23 is disengaged and the rotary coupling 20, 24 is now engaged. The stop ring 36 will maintain the coupling nut 22 against rotation in this situation so that unintentional turning of the coupling nut on the shaft thread 25 will not occur during the switching of the coupling conditions of the rotary couplings.

During subsequent stages of this braking operation, the brake cylinder piston 2 will be further moved in the braking direction together with the sleeve 7, but the coupling nut 22 will be prevented from rotation by engagement of the rotary coupling 20, 24. The shaft 26 which is retained against rotation by its connection with the brake linkage is also displaced and in connection with the resilient deformation of the brake linkage will exert a powerful application or operation of the brake. The stop 32 will carry along the stop ring 36 which will become separated from stop 16. The spring 34 will retain its tension since the abutment ring 27 will similarly follow the displacement of sleeve 7. As a result, the full application of the braking stroke is not limited in any way by the srping 34.

When the brake piston 2 is subjected to the maximum pressure and the brake is thus actuated to its highest degree or full application, the projecting portion 42 on the guide ring 40 should just engage the pressure stop 15 on the stop ring 11. If this engagement has already occurred, the guide ring 40 will be held back by the stop ring 11 with respect to the sleeve 7, the adjusting nut 38 will abut the stop 15 and will be threaded along the shaft 26 during the remainder of the braking stroke (as described above) up to the maximum force exertion on the brake. The nut 38 rotating on the shaft 26 will be displaced in the direction toward the piston 2. The stop 39 is thus released slightly by the magnitude of the axial projection of the bulge 42 beyond the adjusting nut 38 in the braking direction.

In order to release the brake, the pressure within the cylinder chamber 4 is reduced. During the diminishing of the braking force previously exerted by the pressure medium, the brake linkage will absorb any play therein and will thus displace the shaft 26 in the direction toward the brake cylinder housing 1. By means of the coupling nut 22 and the engaged rotary coupling 20, 24 and also the coupling ring 18, the sleeve 7 will be carried in this release direction along with the brake piston 2. The tension inthe return spring 8 will thus be partially reduced while the compression spring 41 is compressed by the adjusting nut 38 which is retained against rotation by the abutment of the stop 39 on guide ring 40 and the nut 38 will thus be carried along with the shaft 26. As soon as the stop ring 36 which is moving back together with the coupling nut 22 contacts stop 16, the braking force and thus any play in the brake linkage are eliminated and the brake will then abut without any force, if the release stroke of the brake has been properly set.

During further reduction of pressure in the chamber 4, only the return spring 8 will press the piston 2 and the sleeve 7 back into the initial release or inoperative position. The brake linkage will no longer exert any force on the adjusting shaft 26 but this shaft will be loaded opposite to the release direction by the compression spring 41 acting through the guide ring 40, stop 39 and adjusting nut 38. The rotary coupling 20, 24 will be disengaged during this release movement of the sleeve 7 while the coupling nut 22 will remain stationary for a relatively short time and the rotary coupling 21, 23 will be engaged immediately thereafter. The coupling nut 22 is not retained against rotation by the engaged rotary clutch 21, 23 by the force of spring 41 and will be urged back because of the force of the return spring 8 exerted through sleeve 7 and coupling ring 19 to thus carry back the shaft 26 through threads 25.

This return movement of the shaft 26 will produce, on one hand through the brake linkage, a release of the brake by the amount of the release clearance thereof whereby the brake will come back into its completely released condition and, on the other hand, will achieve a further compression of the spring 41 through the action of the adjusting nut 38 and the guide ring 40. During this return movement, the flange 32 will be separated from the stop ring 16. When the piston 2 contacts the bottom of the cylinder, the completely released condition of the device is again attained as shown in FIG. 1.

If, because of previous wear of the brake shoe, the release stroke has been set too long, then the brake linkage will already be unstressed before the stop ring 36 contacts stop 16 during the return movement associated with the release of the brake. Since no further force is exerted by the brake linkage on the spindle shaft 26, the shaft 26 will then remain stationary under the force of the compression spring 41 acting in the opposite direction during further return movement of the piston 2 and sleeve 7 together with the coupling rings 18 and 19. The rotary coupling 20, 24 will then become slightly disengaged. Immediately upon the release of rotary coupling 20, 24, the coupling nut 22 will begin to thread itself back upon the shaft 26 which is stationary because of the force exerted by the spring 34 upon the coupling nut 22 through thrust bearing 35, stop ring 36 and stop 33 and supported on the other side by the sleeve 7 through abutment ring 27. Thus, the coupling nut 22 will be threaded back on the adjusting shaft 26 to correspond to the return travel of the brake cylinder piston 2 and sleeve 7 until stop ring 36 abuts stop 16. The spring 34 will then be arrested against stop ring 11 and is no longer able to exert any return force on the coupling nut 22. The adjusting operation is now completed.

During any further return travel of the piston 2 and sleeve 7 under the force exerted by the return spring 8, the coupling nut 22 will remain stationary for a short duration of time and the rotary coupling 20, 24 will be released and the rotary coupling 21, 23 will be engaged. The stop ring 36 which contacts the stop 16 so as to be non-rotatable thereagainst will retain the coupling nut 22 against rotation. Subsequent release operations will occur as described above.

Figure 2:
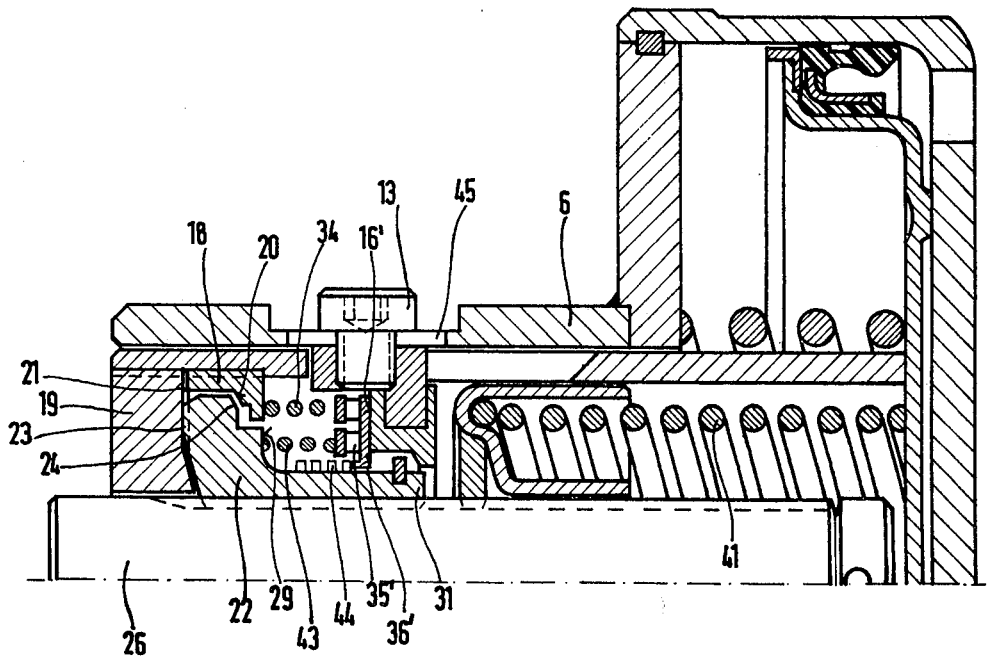
FIG. 2 is a view similar to that of FIG. 1 but showing a double-acting embodiment of the adjusting device.

If it is desired that the above described adjusting device be double-acting so as to be able to correct an excessively large and excessively short contact stroke of the brake linkage, an additional compression spring 43 is inserted within the spring 34 as shown in FIG. 2. The spring 43 has one end acting upon a second thrust bearing 35' which similarly contacts a stop ring 36' which is rotatably mounted on the extension 31 of the coupling nut 22. The other end of compression spring 43 is resiliently urged by initial tension against the annular shoulder 29 on the coupling nut 22. The stop ring 36' can be made rotatable with respect to the coupling nut 22 by removing those portions of the stop ring 36' that engage the flat portion 30 on the coupling nut extension 31. One such structure may comprise merely of utilizing a stop ring 36' with a circular central opening so that this opening is rotatable upon the extension 31.

Except for securing the adjusting device of FIG. 2 against shock and impact stresses, the double-acting adjusting device of FIG. 2 during braking and release operations will function similarly to the single-acting adjusting device of FIG. 1 when the contact stroke is set properly or is too large. It is therefore not necessary to repeat the braking and release sequence of steps as described above. With the exception of a temporary increase of the force of engagement of rotary coupling 21, 23, the second compression spring 43 will not perform any function during the braking or release operations.

In the event that the brake contact stroke is too short, the adjusting shaft 26 will be carried along during the axial displacement of piston 2 through spring 41 until brake contact is established as described above but in the adjusting device of FIG. 2 the movement of the shaft 26 will be assisted by the additional compression spring 43. Upon establishing initial brake contact, the shaft 26 will cease its displacement but the coupling ring 19 will continue to move and will become separated somewhat from the coupling nut 22 to cause the rotary coupling 21, 23 to be open. The compression spring 43 which is acting against stop 16 through thrust bearing 35' will rotate the coupling nut 22 in accordance with the forward movement in the braking direction of the sleeve 7. The compression spring 43 will rotate together with the coupling nut 22. The coupling nut 22 will be threaded in this manner upon the threads 25 of shaft 26 until flange 32 abuts stop ring 36'. The coupling nut 22 will then be axially displaced with respect to the shaft 26 by a distance corresponding to the previous inadequacy of the contact stroke of the brake and the contact stroke will thus be re-set to its proper value. The subsequent complete or tight breaking application and then the release of the brakes are carried out as described above with respect to the adjusting device of FIG. 1 with respect to the initial engagement of the rotary coupling 20, 24.

In order to prevent unintentional displacement or shifting of the double-acting adjusting device of FIG. 2 such as might occur from shocks and impacts brought about during movement of the vehicle, the stop ring 36' is connected to the coupling nut 22 by means of a free-wheeling or uni-directional device which has the effect of blocking the rotation of the coupling nut 22 in the direction which would shorten the contact stroke, the direction of movement toward piston 2. The free-wheeling device according to the present invention comprises a coil spring 44 which is slid upon the extension 31 under a very slight pre-tension and one of the spring ends engages a bore or groove of the stop ring 36' so as to block rotation in one direction but which may permit axial displacement. During the braking, release and adjusting operations, the coil spring 44 will not obstruct the relative rotations in the direction of the free-wheeling function nor the relative axial displacement between coupling nut 22 and stop ring 36' since during these operations the spring 44 will be positioned almost loosely on the extension 31 or will be detached from the extension by unwinding.

However, when the brake is released, should the shaft 26 be subjected to shock stresses which would have the effect of urging the shaft 26 back against the force of spring 41 so as to tend to disengage the rotary coupling 21, 23, the force of compression spring 43 will prevent coupling nut 22 from rotating so as to be threaded to the right as shown in FIG. 2. As a result, the free-wheeling device 44 will be immediately tightened upon the extension 31 so as to lock and couple the extension 31 with the stop ring 36' which is non-rotatably held against stop 16. This will prevent an unintentional rotation of coupling nut 22 on the shaft threads 25. A particular advantage of the free-wheeling device 44 is that upon contact of stop ring 36' and stop 16 during a brake release operation, the locking action of the spring 43 will immediately prevent coupling nut 22 from undesirably rotating so as to be threaded to the right under the effect of residual kinetic energy in the coupling nut 22.

It is also pointed out that in the double-acting adjusting device of FIG. 2 the spring 34 and compression spring 43 do not limit in any way the tight or complete braking stroke.

The adjusting device of FIG. 2 may also be provided with a plurality of longitudinally extending slots 45 in the tubular projection 6 and the screws 13 are positioned within the slots. The stop 16 can then be adjusted in the axial direction by unloosening of the screws 13, repositioning the stop 16 as may be desired and then tightening of the screws 13. The contact stroke of the brake can thus be set very precisely over a wide range from relatively small to relatively large values by the simple expedient of adjusting the axial position of the stop 16. This structure for axial adjustment of the stop 16 can also be provided in the adjusting device of FIG. 1.

Figure 3:
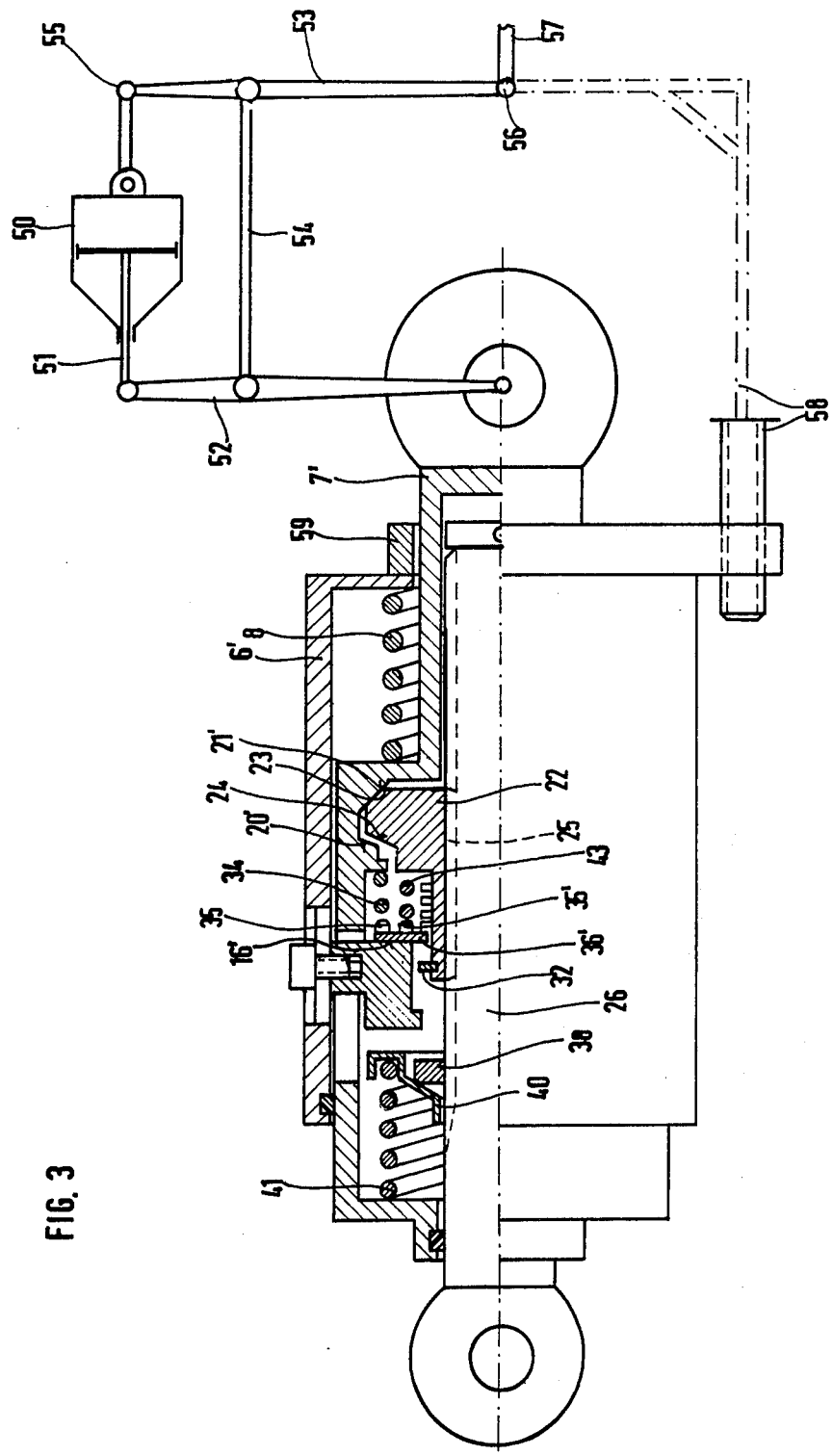
FIG. 3 is an elevational view of a double-acting embodiment of the adjusting device with a portion thereof being shown in a longitudinal section and illustrating the incorporation of the device into a brake linkage which is separate from the brake cylinder.

In FIG. 3, there is illustrated a brake adjusting device in accordance with the present invention which can be constructed into the brake linkage and it is not combined with a braking force motor. This adjusting device corresponds in function and relative positioning of the essential components to the adjusting device of FIG. 2. Since corresponding parts are designated with the same reference numerals as in FIGS. 1 and 2, it is not deemed necessary to describe in detail the construction and operation of the adjusting device of FIG. 3.

In FIG. 3, a simple brake cylinder 50 has a piston rod 51 whose end is pivotally connected to a brake lever 52 of a conventional and known H-type brake linkage which includes a second brake lever 53 pivotally interconnected by a pull-rod 54 to the brake lever 52. The other end of brake lever 52 is pivotally connected to sleeve 7' which is co-axial at least over a portion of its length to the adjusting shaft 26 and it is provided with mutually directed coupling surfaces 20' and 21'. The second brake lever 53 has one end pivotally connected to a fixed point 55 and has its other end pivotally connected at 56 to a brake linkage member 57 that leads directly to the brake which is known in the art and not shown in the drawing.

As known in the art, a lever 58 only portions of which are shown in dashed lines is pivotally connected to the pivot point 56. The lever 58 is adjustably connected to a ring 59 mounted for axial displacement on the sleeve 7'. The ring 59 is connected to the tubular projection 6' which surrounds the sleeve 7'. The return spring 8 is connected between the tubular projection 6' and the sleeve 7'. The coupling surfaces 20' and 21' are on opposite sides of coupling nut 22 which is provided with corresponding coupling surfaces 23 and 24. Compression spring 43 is inserted between coupling nut 22 and a stop 16' on tubular projection 6' to act upon stop ring 36' through thrust bearing 35'. The spring 34 positioned between sleeve 7' and stop 16' similarly acts upon stop ring 36' through thrust bearing 35. Similar to the adjusting device of FIG. 1, the coupling nut 22 is provided with a flange 32 which is engageable with stop ring 36'. Adjusting nut 38 is threaded upon adjusting shaft 26 and is contacted by compression spring 41 through guide ring 40. The compression spring 41 is positioned so that its other end acts against sleeve 7'.

As pointed out above, the remaining structure and function of the adjusting device of FIG. 3 corresponds fully to that of the adjusting device of FIG. 2. However, it is to be noted that the adjustment device of FIG. 3 is subjected to tension stresses while the adjusting device of FIG. 2 is subjected to compression stresses. In view of the above, it is not believed necessary to describe in further detail the operation of the adjusting device of FIG. 3.

As a modification, the adjusting device of FIG. 3 may be constructed in accordance with the illustration of FIG. 1 by omitting compression spring 43 so that the adjusting device of FIG. 3 will be a single-acting device.

Thus it can be seen that the present invention has disclosed a brake linkage adjusting device which can be constructed to be single-acting by providing a spring acting in the braking direction against an abutment supported on the sleeve and which can be simply constructed to be double-acting in operation by providing an additional compression spring between the stop ring and coupling nut so as to load the coupling nut in the direction of braking. In addition, the contact stroke is determined only by a single dimension or parameter and the spring does not limit in any way the tight or complete braking stroke.

It will be understood that this invention is susceptible to modification in order to adapt it to different usages and conditions, and accordingly, it is desired to comprehend such modifications within this invention as may fall within the scope of appended claims.

What is claimed is:

1. In an automatic brake resetting device particularly for brakes of railway vehicles the combination of a non-rotatable sleeve axially displaceable in the braking direction in response to a braking force, an axially displaceable non-rotatable threaded shaft co-axially disposed within said sleeve, a coupling nut threaded upon said shaft and capable of rotary and axial movement thereon, means on said sleeve for defining a first rotary coupling with one side of said coupling nut and a second rotary coupling with the other side of said coupling nut, said rotary couplings being actuable by axial displacement of said coupling nut, a stop ring traversing said coupling nut and axially displaceable thereon, a fixed first stop to support said stop ring opposite to the braking direction, abutment means on said sleeve, a second stop on said coupling nut spaced rearwardly of said first stop a distance approximately equal to the contact stroke of the vehicle brake, first spring means acting upon said stop ring opposite to the braking direction of said sleeve and acting upon said abutment means and said sleeve in the braking direction, and second spring means between said stop ring and said coupling nut mounted for rotation in at least one direction and acting upon said coupling nut in the braking direction.

2. In an automatic brake resetting device as claimed in claim 1 wherein said coupling nut has an extension, said stop ring non-rotatably mounted on said extension at least in the direction of rotation of said coupling nut to shorten the contact stroke.

3. In an automatic brake resetting device as claimed in claim 1 and further comprising means for axially adjusting said first stop, and free wheeling means interconnecting said coupling nut to said stop ring for blocking the rotation of the coupling nut in the direction to lengthen the brake linkage.

4. In an automatic brake resetting device as claimed in claim 3 wherein said coupling nut has an extension, said free-wheeling means comprises a coil spring on said coupling nut extension and connected to said stop ring for unilateral rotation.

5. In an automatic brake resetting device as claimed in claim 1 wherein said second spring means comprises a compression spring and said first spring means surrounds said second spring means.

* * * * *